June 14, 1927.
A. U. S. DANIELSSON
1,632,023
COMPRESSED AIR STARTING DEVICE OF INTERNAL COMBUSTION ENGINES
Filed Feb. 5, 1923
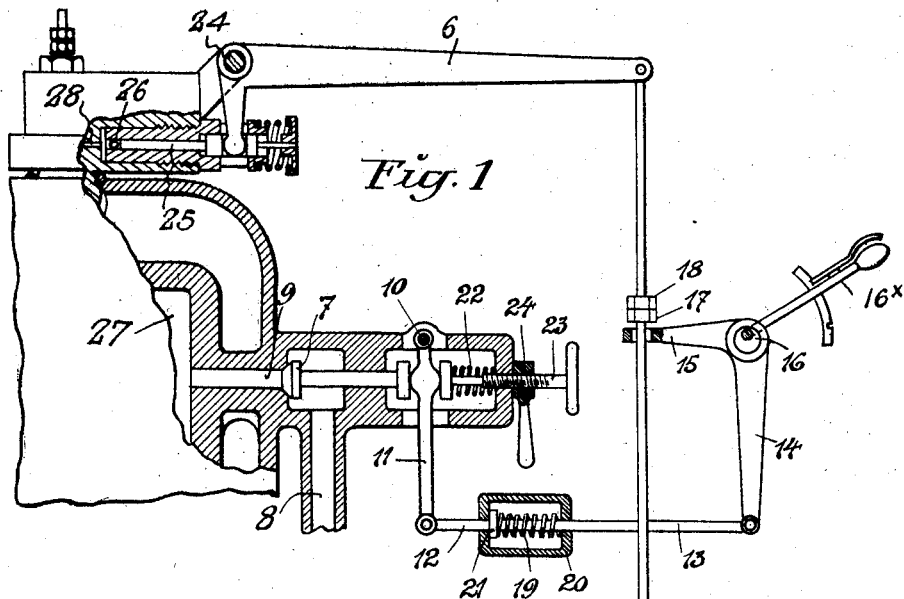
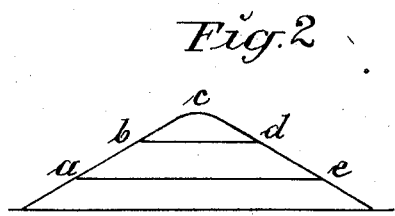
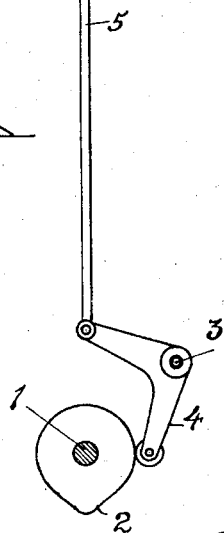
Inventor:
A. U. S. Danielsson
By Marks Clerk
Attys.

Patented June 14, 1927.

1,632,023

UNITED STATES PATENT OFFICE.

AXEL UNO STURE DANIELSSON, OF ULFSUNDA, SWEDEN, ASSIGNOR TO AKTIEBOLAGET ATLAS DIESEL, OF STOCKHOLM, SWEDEN, A CORPORATION OF SWEDEN.

COMPRESSED-AIR STARTING DEVICE OF INTERNAL-COMBUSTION ENGINES.

Application filed February 5, 1923, Serial No. 617,043, and in Sweden February 2, 1922.

This invention relates to an arrangement in internal combustion engines started by means of compressed air, owing to which the valve admitting the compressed air may be shifted by the same cam, which actuates the fuel pump or any other member causing the introducing of the fuel into the working cylinder. The invention is applicable especially to internal combustion engines of that type, in which the fuel pump is located near the combustion chamber of the working cylinder and is actuated by a cam, provided on the crank shaft, and by means of a link extending upwards from the said shaft to the top of the engine. In engines of the said type the movement of the starting valve may be derived for instance from the said link.

Fig. 1 of the accompanying drawing shows diagrammatically a starting device arranged in accordance with this invention and adapted to an engine of the type just stated. Fig. 2 shows a diagram.

1 is the crank shaft of the engine, and 2 is a cam, which is provided on the said shaft and by means of a bell crank lever 4, pivoted at 3, and a link 5 actuates a bell crank lever 6, pivoted at 24 connected with the plunger or piston 25 of the fuel pump of the engine. The said plunger 25 sucks the fuel from the receptacle through a channel 26 provided with a non-return valve (not shown) and forces the same into the working cylinder 27 through channel 28 in the well known manner. 7 is the admission valve of the compressed air, effecting communication between a conduit 8, extending for instance from an accumulator, charged by the engine itself or in any other manner, and an inlet 9 to the working cylinder of the engine. To the valve spindle a lever arm 11 is connected, which is pivoted at 10 and by a divided link 12, 13 is connected with a bell crank lever 14, 15, swingable on an eccentric pin 16. By rotating the said pin 16 by means of a handle 16ˣ, the bell crank lever 14, 15 may be raised to such a level, that its arm 15 is actuated by an adjustable abutment, provided on the link 5 and consisting for instance of a nut 17 with lock nut 18 in screw-threaded engagement with the link 5. Between the parts 12 and 13 of the divided link a spring 19 is provided, bearing against the bottom wall of a sleeve 20, connected with the part 12, and a flange 21 provided on the part 13. The spindle of the valve 7 is acted upon by a spring 22, tending to close the valve, and the valve may be locked in closed position by means of a screw 23, serving as an abutment for the valve spindle and provided with a lock nut 24.

During the operation of the engine the valve 7 is held in closed position by the screw 23 as shown in the drawing. The bell crank lever 14, 15 has been lowered to such a level, that its arm 15 is not acted upon by the abutment 17. For the starting of the engine the valve 7 is released, by turning the screw 23 outwards, and the bell crank lever 14, 15 is raised by rotating the eccentric pin 16, so that the arm 15 may be actuated by the abutment 17. The crank shaft 1 is rotated through such an angle, that the piston of the working cylinder has passed for a short distance the starting point of its expansion stroke. The cam 2 then actuates the bell crank lever 4, which by means of the link 5, abutment 17, bell crank lever 14, 15, link 12, 13 and lever arm 11 opens the valve 7, so that compressed air is forced into the working cylinder 27 and drives the engine. Consequently, the engine operates as an air engine. After the starting of the engine the valve 7 is again locked in closed position and the bell crank lever 14, 15 is brought into such a position, that it is not acted upon by the abutment 17. The opening of the valve 7 is controlled by adjusting the position of the abutment 17 relatively to the bell crank lever 14, 15. The valve 7 ought to be opened comparatively quickly by the cam 2, for instance during the part designated by a—b in the diagram, Fig. 2, illustrating the movement of the link 5 moved upwards and downwards at constant velocity by the cam 2. The valve is then held in open position during the part b—c—d and is closed comparatively quickly during the part d—e. The object of the spring 19 is to render possible the opening of the valve in the stated manner without any one of the parts transmitting the movement to the valve being damaged. The tension of the spring 19 is so great, that the spring is able to overcome the pressure of the spring 22 and the air contained in the accumulator. As the valve has been opened and the valve spindle bears against the screw 23, the spring 22 is compressed during the part b—c of the diagram and will then expand during the part c—d. The object of the spring 19 is also to prevent the breaking of the motion transmitting members, if the operator, at the starting of the engine neglects to release the valve 7 by turning the screw 23 outwards.

The motion necessary for shifting the valve 7 may, evidently, be derived from any one of the members which contribute to move the fuel plunger. In any case a simple device is gained for the controlling of the pressure air valve by means of the same cam which actuates the fuel pump.

The invention may, evidently, be modified in many respects without exceeding the limits of the same.

I claim.

1. In an internal combustion engine adapted to be started by means of compressed gas the combination of a starting valve, a pump feeding fuel into the combustion chamber of the working cylinder of the engine, driving means for the said pump including a reciprocating member, an abutment provided on the said member, a movable member coupled to the starting valve, and means for bringing the said movable member into the path of said abutment and out of the same.

2. In an internal combustion engine adapted to be started by means of compressed gas, the combination of a starting valve, a pump feeding fuel into the combustion chamber of the working cylinder of the engine, an engine rotatable cam, pump operating mechanism between the cam and the pump and including a vertically disposed connecting rod, an abutment on the rod, starting valve operating mechanism, and manually operable means in connection with the starting valve operating mechanism for moving a part of said mechanism into and out of the path of movement of the abutment for controlling the operation of the starting valve.

In testimony whereof, I have signed my name to this specification.

AXEL UNO STURE DANIELSSON.